United States Patent Office 3,547,810
Patented Dec. 15, 1970

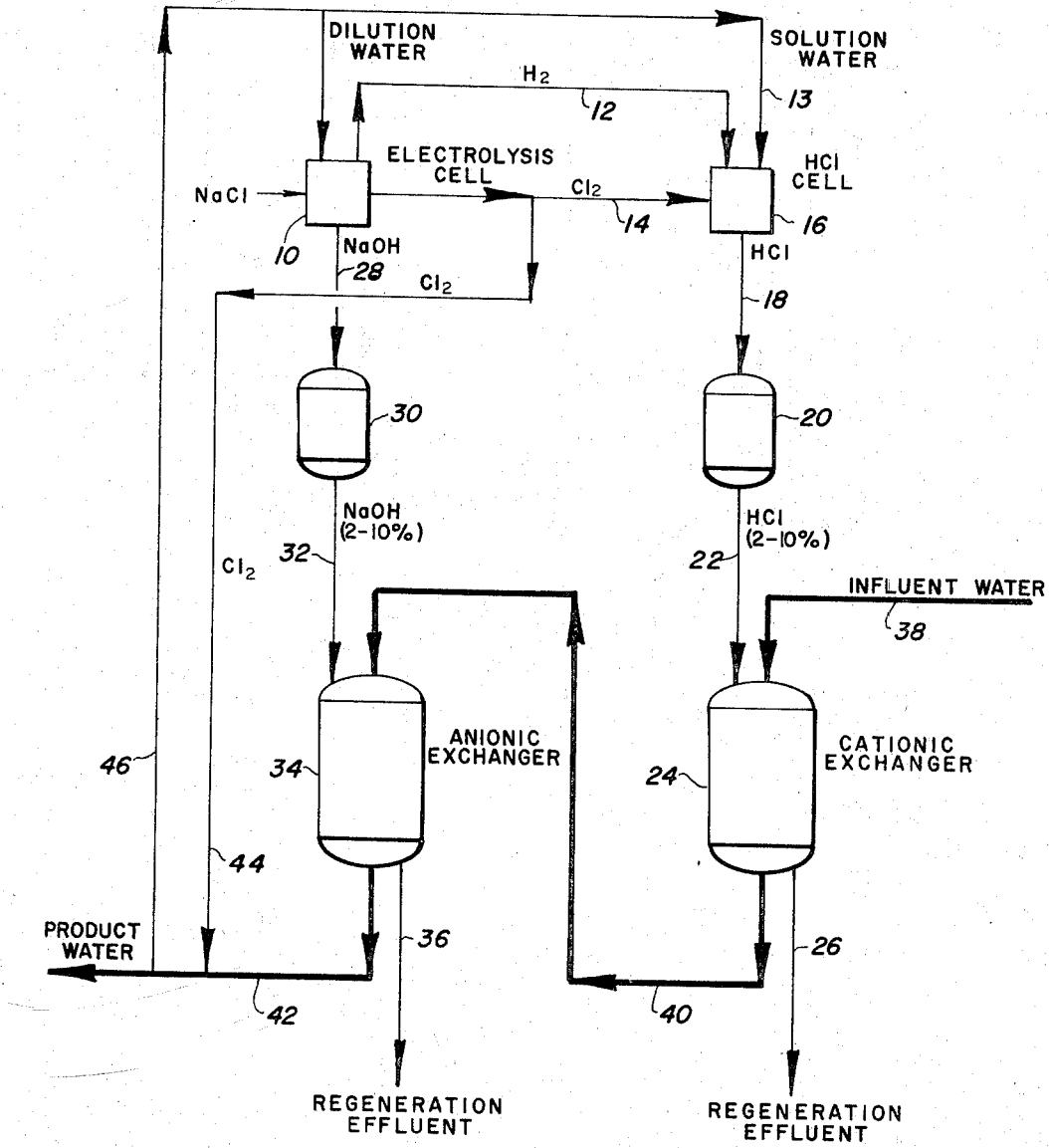

3,547,810
TREATMENT OF WATER
Hal B. H. Cooper, 4234 Chevy Chase Drive,
Pasadena, Calif. 91103
Filed May 22, 1968, Ser. No. 730,997
Int. Cl. B01d 15/06; C02b 3/06
U.S. Cl. 210—62                                      2 Claims

ABSTRACT OF THE DISCLOSURE

In the demineralization of water, a process for regenerating exhausted anionic and cationic exchange resins requiring the delivery to the treatment site only of innocuous sodium chloride which is used to produce a low cost aqueous caustic soda regenerating solution and a low cost aqueous hydrochloric acid regenerating solution by utilizing an electrolysis cell in combination with a hydrochloric acid producing cell. The electrolysis cell is operated to produce from a salt (sodium chloride) brine a salt-free caustic soda regenerating solution, hydrogen, and chlorine. The hydrogen and chlorine are reacted in the hydrochloric acid cell to produce therefrom an aqueous hydrochloric acid regenerating solution. Chlorine from the electrolysis cell may be used to sterilize the demineralized product water.

BACKGROUND OF THE INVENTION

Field of the invention

This invention relates to the treatment of water with ion exchange resins to effect demineralization, and in a preferred embodiment, provides chlorine for sterilizing the product stream.

The most conventional method for demineralizing water employing ion exchange resins involves the use of a cation exchange resin in the acid form and an anion exchange resin in the basic form. The hydrogen ions of the cation exchange resin are exchanged with metal cations of the raw water, the cations of the water being typically sodium, magnesium, and calcium, and the anions of the polar liquid being treated are replaced by hydroxyl groups from the anion exchange resin, typical anions being chloride, sulfate and nitrate. The result of this dual resin treatment is the replacement in the polar liquid of the anions and cations by hydrogen ions and hydroxyl ions to give a desalinized product.

In a typical installation employing the hydrogen-hydroxide ion exchange resin system, two regenerants are used to regenerate the exhausted ion exchange resins to their respective hydrogen and hydroxide forms. Acid is used to regenerate the cation exchange resin while a base is employed for the regeneration of the anion exchange resin. Hydrochloric or sulfuric acids and caustic soda are common regenerants for such a dual resin system. A water treatment system of this type utilizing an ionic and cationic exchanger normally requires the delivery to the site of hydrochloric or other strong mineral acid for regeneration of the cationic exchanger and caustic soda, soda ash, or ammonia for the regeneration of the anionic exchanger. In those instances where the product stream from the dual resin treatment is to be chlorinated, chlorine would have to be delivered in high pressure cylinders.

Summary of the invention

In the applicant's dual resin system for the treatment of water and other polar liquids, only one material, namely the innocuous and inexpensive solid, sodium chloride, is the sole feed material required for the operation of the system. The system is based on a sodium chloride electrolytic cell which is operated to provide an aqueous caustic soda stream (free of salt), chlorine gas, and hydrogen gas. The hydrogen and chlorine are passed to a hydrochloric acid generating unit which may be of the various forms known to the art including that described in Encyclopedia of Chemical Technology, second edition, vol. 11, pages 313 et seq. Kirk-Othmer. The hydrogen and chlorine gas are combined in the hydrogen chloride generating cell, and absorbed in water to provide an aqueous hydrochloric acid solution.

The cationic exchange resin and the anionic exchange resin periodically become exhausted and must be regenerated. In the process of the invention, the aqueous caustic soda solution and hydrochloric acid solution, both produced from the solid sodium chloride, are used respectively for the regeneration of the exhausted anionic exchange resin and the exhausted cationic exchange resin. Where desired, chlorine from the sodium chloride electrolytic cell is available for the further treatment of the product stream. The chlorine not only serves to destroy microorganisms but may be utilized to oxidize organics to less complex molecules, including carbon dioxide. Thus, it is seen that with the integrated water treatment system of the invention, regeneration of the cationic and anionic exchangers, along with chlorination, is accomplished through delivery of only one material to the dual resin plant, and that is, innocuous and easily transportable sodium chloride. The economical manner of resin rejuvenation provided by the process of the invention makes it at last possible to capitalize on the low energy cost long promised by ion exchange resins for the demineralization of water and other polar liquids.

The process of the invention may be utilized for municipal water treatment, sewage treatment, treatment of brackish water supplies, industrial applications, military uses, and is generally adaptable to portable water processing units. The process of the invention is particularly adaptable to remote areas where it is not feasible to bring in tank cars or large containers of chlorine, caustic soda and mineral acid, heretofore required for use in a dual resin water treatment system. The water treatment system of the invention is especially adaptable to an automated packaged plant concept.

The demineralization of water by the process of the invention is effective in removing the common occurring anions and cations from waters of low total dissolved solids to relatively high total dissolved solids, for example, from brackish waters containing a 1000 to 5000 p.p.m. total dissolved solids. The demineralization that may be accomplished by the process of the invention will make such brackish waters potable or usable for industrial purposes.

In the practice of the process of the invention, the cationic exchanger will normally precede the anionic exchanger, as is common practice now in the industry in the demineralization of water and other polar liquids. It will be appreciated, however, that the aqueous caustic soda regenerant stream and the hydrochloric acid regenerant stream produced in the process of the invention are available for regeneration of the anionic and cationic exchange resins, wherever the resins are located in the treatment of the product stream.

A preferred system for the practice of the process of the invention is illustrated in the accompanying flow diagram wherein sodium chloride in the form of a brine is supplied to an electrolysis cell which may be of the general type illustrated in Tirrell et al. U.S. Pats. 3,135,673 and 3,222,267 and in applicant's copending U.S. patent applications Ser. Nos. 357,109 and 691,283 filed on Apr. 3, 1964, now U.S. Pat. No. 3,390,065 and Dec. 18, 1967, now U.S. Pat. No. 3,496,077 respectively. A strong brine solution is passed to an anode compartment of an electrolysis cell 10 which has a cationic selective exchange membrane separating the anode compartment from the cathode compartment. As described in the foregoing patents and patent applications, a direct current is passed transversely through the anode and cathode compartments and the cationic-selective ion exchange membrane to produce chlorine gas in the anode compartment and hydrogen and aqueous caustic soda solution in the cathode compartment. The hydrogen gas and chlorine gas are delivered in lines 12 and 14, respectively, to a hydrochloric acid producing cell 16. In the HCl cell 16, the hydrogen and chlorine are reacted to produce hydrogen chloride vapors which are absorbed in water provided by a line 13 to produce an aqueous hydrochloric acid solution. The aqueous hydrochloric acid solution from the HCl cell 16 is passed in a line 18 to a reservoir 20 from whence it is delivered, typically in a concentration in the range of 2–10 percent of HCl by weight, usually 3–5 percent, through a line 22 to regenerate the exhausted resin of a cationic exchanger 24. It will be appreciated that the concentration of the HCl in the regenerating solution may be varied to meet the demands of the particular system. The cations typically removed from the exhausted resin are sodium, calcium and magnesium which are flushed from the cationic exchanger 24 in the regeneration effluent stream of line 26. The regeneration stream 22 of aqueous hydrochloric acid restores the cationic resin to its hydrogen form. In a typical system, there will be provided two cationic exchangers making it possible to process continuously the water or other polar liquid, while the exhausted resin of one of the exchangers is being regenerated. The HCl solution may also be used to regenerate exhausted cationic-exchange resin in systems employing continuous operation, but for purposes of simplicity, the more commonly used batch system is described herein.

The aqueous caustic soda produced in the electrolysis cell passes through a line 28 to a caustic soda reservoir 30 from whence it is delivered when needed through a line 32 to regenerate the anionic exchanger 34. The aqueous caustic soda stream produced in the cell is essentially free of sodium chloride. Typically, the caustic soda regenerating stream will have a sodium hydroxide content by weight of 2–10 percent, usually 3–5 percent. It will be appreciated that the particular concentration of the caustic soda may be varied to meet the demands of the system. The caustic regeneration stream 32 is used to remove such anions as the sulphate, chloride, and nitrate ions from the exhausted resin and restores the anionic exchange resin to its hydroxyl form. The anions of the water stripped from the anionic resins are removed from the exchanger 34 in a regeneration effluent stream 36. Usually, the anionic exchanger will be provided in two parallel beds in order that one may be on stream while the other is being regenerated, although as with the cationic exchanger, the caustic soda regenerating solution may also be used in systems employing continuous operation.

In the system illustrated in the flow diagram influent water being processed is passed in a line 38 to the cationic exchanger 24 wherein its cations are removed with the substitution of hydrogen ions therefor. The water passes from the cation exchanger 24 through a line 40 to the anionic exchanger 34 where its anions are removed and hydroxyl ions substituted therefor. The demineralized product water leaves the anionic exchanger 34 in a line 42 and depending on the end use of the product water, chlorine from the electrolysis cell 10 is introduced into the stream through a line 44. Water for the operation of the electrolysis cell 10 and the hydrochloric acid generating cell 16 is diverted from the product stream 42 through a line 46.

The anionic exchange resin and the cationic exchange resin, employed in the process, are resins known in the art and do not in themselves constitute a part of this invention. Available commercial ion exchange resins, both anionic and cationic, suitable for use in the process are described in Encyclopedia of Chemical Technology, second edition, Kirk-Othmer, vol. 11, pages 871–899.

The process of the invention may be employed to regenerate anionic resins of either the hydroxide or the amine form. Various exhausted anionic resins, including both weakly basic and strongly basic types, which can be regenerated with caustic soda may be treated in accordance with the process of the invention. Among the anion exchange resins which may be employed in the practice of the invention are resins disclosed in U.S. Pats. 2,591,573, 2,597,440, 2,597,494, 2,614,099 and 2,630,427. Numerous anion exchange resins are available for use in the practice of the invention.

Various cation exchange resins having exchangeable hydrogen ions are known in the prior art and may be used in the process of the invention, including sulfonate resins. The sulfonated styrene divinyl benzene strongly acid cation exchange resin of U.S. Pat. 2,366,007 may be employed, for example. Another suitable type of hydrogen substituted cation exchange resin is the sulfonic acid phenol-formaldehyde resin such as the resin derived by condensing a phenol sulfonic acid with formaldehyde. Less acid types based on the carboxylic acid group are also suitable including phenolic condensation reaction products which incorporate the carboxylic acid group.

The process of the invention may be used for regenerating exhausted ion exchange resins in either batch or continuous type operations. Continuous contactors which may be readily modified to benefit from the process of the invention include systems described in Encyclopedia of Chemical Technology, second edition, Kirk-Othmer, vol. 11, pages 893-897, including contactors such as the Higgins, Asahi and Aconex units.

The process of the invention in providing less expensive caustic and MCl regenerant solutions makes attractive the use of ion exchange resin systems for the treatment of water containing higher concentrations of salts than is normally thought practical for such ion exchange resin systems. The process of the invention is suitable for partially or substantially complete demineralization of water to make it potable or suitable for industrial uses.

Although an exemplary embodiment of the invention has been disclosed herein for purposes of illustration, it will be understood that various changes, modifications, and substitutions may be incorporated in such embodiment without departing from the spirit of the invention, as defined by the claims which follow:

1. In a process for the treatment of water employing a cationic exchange resin and an anionic exchange resin and wherein there is periodic regeneration of the exhausted resins, the improvement comprising:
   (a) regenerating the exhausted cationic exchange resin by contacting the resin with an aqueous hydrochloric acid solution;
   (b) regenerating the exhausted anionic exchange resin by contacting the resin with an aqueous caustic soda solution;
   (c) producing from a sodium chloride brine solution the aqueous hydrochloric acid solution and the aqueous caustic soda solution utilizing an electrolysis cell and a hydrochloric acid cell, wherein:
     (1) the brine solution is passed to an anode compartment of the electrolysis cell having a cationic-selective ionic exchange membrane separating the anode compartment from a cathode compartment,
     (2) a direct current is passed transversely through said compartments and the cationic-selective ionic exchange membrane to produce chlorine gas in the anode compartment and hydrogen and aqueous caustic soda solution in the cathode compartment, and
     (3) at least a portion of the hydrogen from the cathode compartment and at least a portion of the chlorine from the anode compartment are passed to the hydrochloric acid cell to produce the aqueous hydrochloric acid solution; and (d) utilizing the aqueous hydrochloric acid solution and aqueous caustic soda solution produced in step (c) for the regeneration of the exhausted cationic exchange resin and exhausted anionic exchange resin of steps (a) and (b).

2. A process in accordance with claim 1 wherein at least a portion of the chlorine produced in the electrolysis cell is used for sterilizing the water being processed.

References Cited

UNITED STATES PATENTS 2,794,777 6/1957 Pearson _____ 204—180X
3,223,242 12/1965 Murray _____ 210—62X SAMIH N. ZAHARNA, Primary Examiner U.S. Cl. X.R.

204—180; 210—30